United States Patent
Sjöö et al.

(10) Patent No.: US 6,343,898 B1
(45) Date of Patent: Feb. 5, 2002

(54) CUTTING INSERT AND HOLDER FOR METAL CUTTING MACHINING

(75) Inventors: Sture Sjöö, Gävle; Bernt Larsson, Sandviken; Håkan Ericksson, Kungsgarden; Per Hansson, Gavle, all of (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/722,011

(22) Filed: Nov. 27, 2000

Related U.S. Application Data

(62) Division of application No. 09/337,676, filed on Jun. 22, 1999, now Pat. No. 6,168,356, which is a continuation of application No. PCT/SE97/00546, filed on Mar. 25, 1997.

(30) Foreign Application Priority Data

Dec. 23, 1996 (SE) .............................. 9604855

(51) Int. Cl.⁷ ........................ B23B 29/04; B23P 15/30
(52) U.S. Cl. ........................ 407/101; 407/107; 407/104
(58) Field of Search ................................ 407/104, 105, 407/107, 109, 113

(56) References Cited

U.S. PATENT DOCUMENTS

| | | | |
|---|---|---|---|
| 280,148 A | 6/1883 | Douglas | |
| 3,299,489 A | * 1/1967 | Pohle | 407/104 |
| 3,629,919 A | 12/1971 | Trevarrow, Jr. | |
| 4,283,163 A | * 8/1981 | Grafe et al. | 407/48 |
| 4,315,706 A | 2/1982 | Erkfritz | |
| 4,674,924 A | 6/1987 | Carlsson et al. | |
| 4,755,085 A | 7/1988 | Murén et al. | |
| 5,542,793 A | * 8/1996 | Deiss et al. | 407/35 |
| 5,647,701 A | * 7/1997 | Tempel | 407/113 |
| 5,682,803 A | 11/1997 | Boianjiu | |
| 5,810,518 A | 9/1998 | Wiman et al. | |
| 5,888,029 A | 3/1999 | Boianjiu | |
| 5,924,826 A | 7/1999 | Byström et al. | |
| 5,931,613 A | 8/1999 | Larsson | |

FOREIGN PATENT DOCUMENTS

| | | |
|---|---|---|
| DE | 26 53 222 | 6/1977 |
| DE | 34 02 547 | 8/1985 |
| DE | 36 17 119 | 11/1987 |
| DE | 38 18 970 | 11/1989 |
| SU | 177 9526 | 12/1992 |

* cited by examiner

Primary Examiner—Henry Tsai
(74) Attorney, Agent, or Firm—Burns, Doane, Swecker & Mathis, L.L.P.

(57) ABSTRACT

A metal cutting tool includes a holder arrangement, an indexible cutting insert seated on an insert-receiving site of the holder arrangement, and a screw for fastening the insert to the site. The bottom side of the insert includes more than two upright abutment surfaces arranged to abut respective upright support surfaces of the site, whereby the areas of contact formed by the mutually abutting surfaces lie inside of an outer perimeter of the insert. The abutment surfaces are oriented non-parallel to one another. The screw is arranged to urge the insert in a direction whereby less than all of the abutment surfaces abut respective support surfaces, and at least one abutment surface does not abut a support surface. When the insert is indexed, the non-abutting abutment surface is relocated and caused to abut a support surface when the screw is tightened, while an abutment surface that previously abutted a support surface becomes a non-abutting surface.

3 Claims, 7 Drawing Sheets

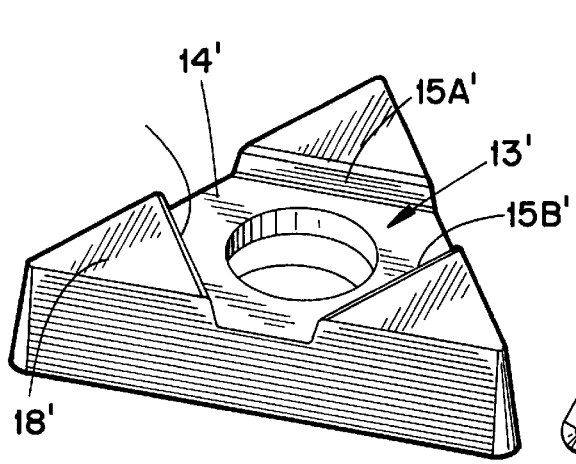
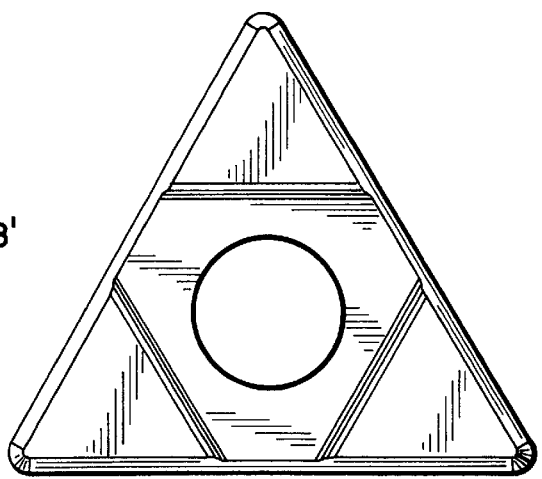
Fig. 2  Fig. 3
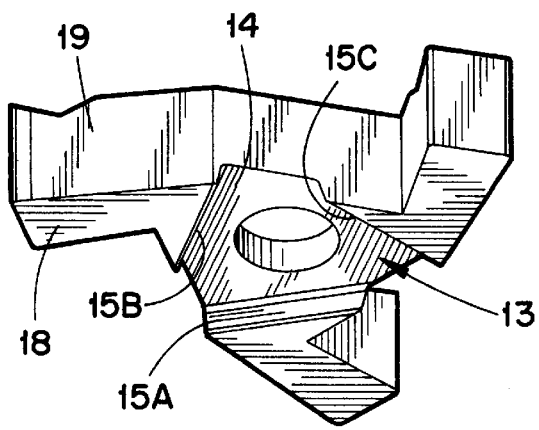
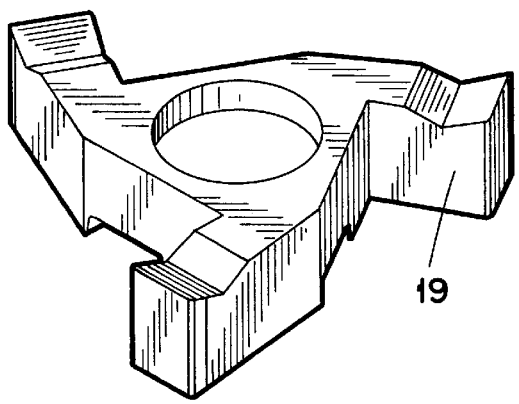
Fig. 4  Fig. 5

CUTTING INSERT AND HOLDER FOR METAL CUTTING MACHINING

RELATED INVENTIONS

This is a divisional of application Ser. No. 09/337,676, filed Jun. 22, 1999, now U.S. Pat. No. 6,168,356, and which, in turn, is a Continuation application of International Application Ser. No. PCT/SE97/00546 filed Mar. 25, 1997.

BACKGROUND OF THE INVENTION

The present invention refers to a cutting insert as well as a holder for metal cutting machining. More exactly the invention concerns a tool which enables the clamping of indexible inserts with different geometrical shapes in one and the same insert pocket.

The use of detachable, indexible inserts is nowadays accepted practice within more or less the entire field of metal cutting machining, i.e. within both turning, milling, drilling, etc. They are usually manufactured in coated or uncoated cemented carbide, but also certain ceramic materials can be used. These different indexible inserts may have very varying geometrical basic shapes, depending on cutting economy and application. They can, for example, be triangular, rhombic, square, rectangular, round, hexagonal (including so-called trigon inserts) and octagonal.

Common for all the different conceivable insert shapes is that they require an insert pocket in the holder adapted to each specific shape. Consequently a square cutting insert normally requires an insert pocket with two support or abutment surfaces which are at right angles to each other; a triangular cutting insert requires generally two abutment surfaces which are angled 60° to each other, etc. This means that a change of insert shape also craves a change of holder. This is both time consuming and expensive. Further the designer's freedom of choice when designing a new cutting insert is limited, since the outer contour of the cutting insert must function at least partially as an operational cutting edge and clearance surface, and also as an abutment surface, when the surface in question is indexed in against the actual insert pocket. This makes it impossible to provide certain desirable cutting geometries. Should the designer nevertheless wish to use such a cutting geometry, he/she will be forced to resort to an insert design without an operational cutting geometry on the side of the cutting insert facing the insert pocket.

A first aim with the present invention is consequently to create cutting inserts which can be clamped in one and the same insert pocket despite having different contour lines.

Another aim with the invention is to produce a cutting insert which does not need to have its side surfaces abut against any abutment surfaces of the holder.

Still a further purpose with the present invention is to produce an insert pocket having wider manufacturing tolerances.

Cutting inserts with a recess in the bottom surface of the cutting insert are known previously through Carlsson et al. U.S. Pat. No. 4,674,924. In that case, the recess functions in its entirety (also even its three side surfaces) as pure non-contact surfaces, whereby the cutting insert shall abut on its three corner parts, which furthermore most preferably are to be angled upwards and inwards.

SUMMARY OF THE INVENTION

The present invention involves a tool for metal cutting machining. The tool comprises a holder arrangement, an indexible cutting insert, and an insert-securing device. The holder arrangement includes an insert-receiving site for receiving a cutting insert. The site includes an upwardly facing bottom support surface and at least two generally upright support surfaces disposed in non-parallel relationship. The cutting insert is seated on the site and includes an upwardly facing chip surface, a downwardly facing abutment surface, and a side surface structure intersecting the chip surface to form therewith a cutting edge structure. The side surface structure defines an outer perimeter of the insert. The generally downwardly facing abutment surface is disposed inside of the outer perimeter and abuts the bottom support surface of the site. The insert further includes at least three generally upright abutment surfaces disposed inside of the outer perimeter. At least two of the generally upright abutment surfaces are disposed in facing relationship to respective ones of the generally upright support surfaces. The insert-securing device is arranged for generating a first force oriented substantially perpendicular to a plane of the insert which presses the downwardly facing abutment surface against the upwardly facing support surface, and a second force oriented substantially parallel to the plane of the insert which presses at least two, but less than all, of the generally upright abutment surfaces against respective ones of the generally upright support surfaces. The second force extends at an oblique angle to the at least two generally upright abutment surfaces. The insert is indexible to bring another portion of the cutting edge arrangement into active cutting position. The generally upright abutment surfaces are arranged such that in response to indexing of the cutting insert, one of the generally upright abutment surfaces previously disposed out of engagement with a generally upright support surface is moved into abutment with a generally upright support surface, and a generally upright abutment surface previously in abutment with a generally upright support surface is moved out of abutment with all of the generally upright support surfaces.

BRIEF DESCRIPTION OF THE DRAWINGS

In order to illustrate but not limit the invention it will now be described more closely with reference to preferred embodiments thereof depicted in the drawings, wherein:

FIG. 2 shows an upside-down cutting insert according to the invention, obliquely from above.

FIG. 3 shows the cutting insert according to FIG. 2, straight from below.

FIG. 4 shows another cutting insert obliquely from below.

FIG. 5 shows the same cutting insert as in FIG. 4, obliquely from above.

DETAILED DESCRIPTION OF PREFERRED EMBODIMENTS OF THE INVENTION

Figure 1:
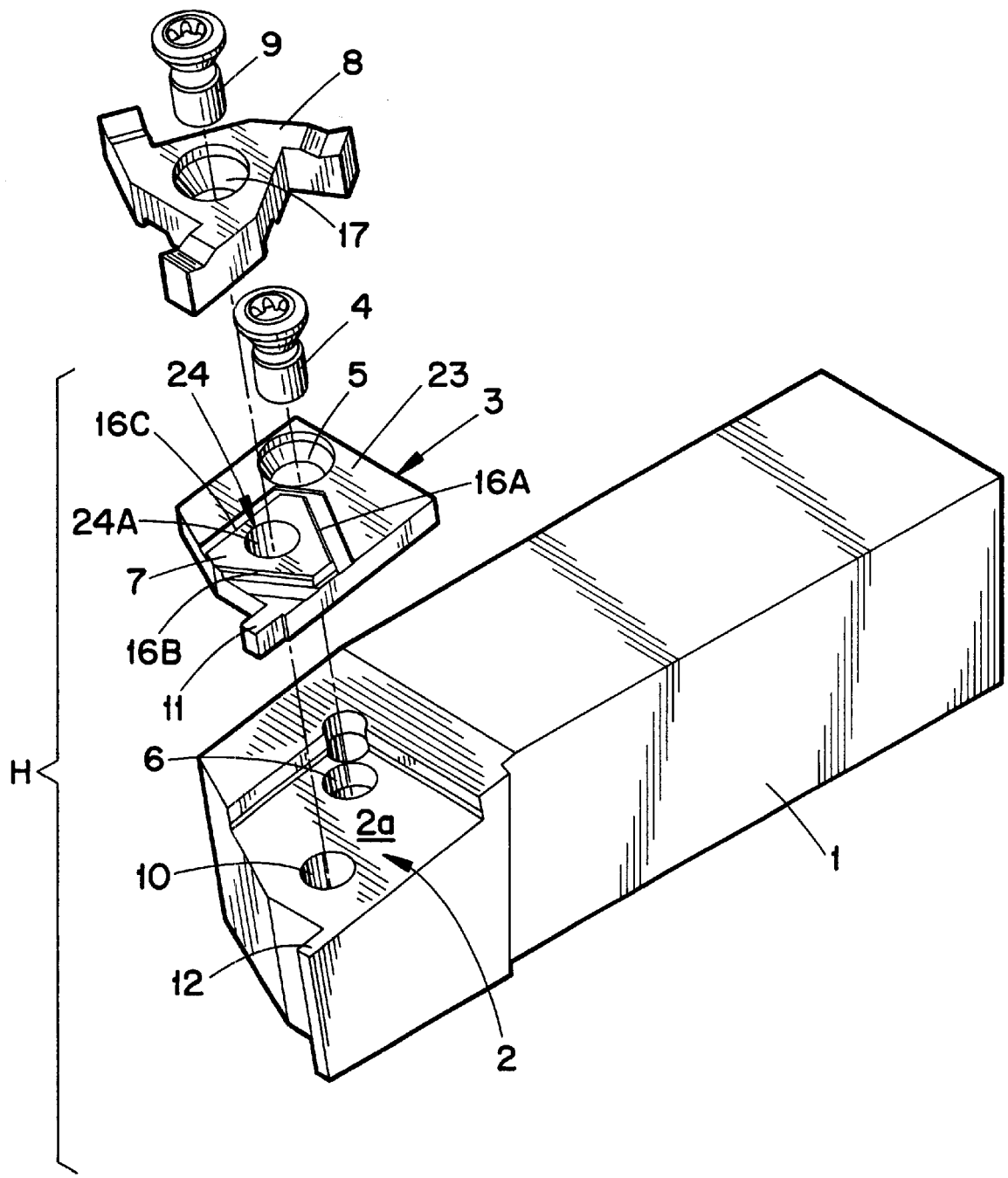
FIG. 1 shows an exploded view of a tool according to the invention, in perspective obliquely from above.

A shaft holder arrangement H for turning applications is shown in FIG. 1. The invention is however not limited to turning applications, but also, for example, milling and drilling applications can be considered. The holder arrangement H includes a shaft holder body 1 and a cassette plate or shim 3. In the forward part of the shaft holder body or recess 2 having an essentially planar mounting surface 2a is provided, which is intended to accommodate the cassette plate 3. This cassette plate can be stabilized in the recess 2 by a locking screw 4, which is fed through a hole 5 in the shim and is screwed fast in a threaded bore 6 in the mounting surface 2a. Further the cassette plate comprises a raised portion 24, which includes a plateau surface 7 facing upwardly and raised in relation to the remaining upper surfaces of the shim, but which is not intended to come in direct contact with a cutting insert 8. Both the cassette plate 3 and the shaft holder body 1 include protruding parts 11 and 12 to support the operative cutting corner of a cutting insert 8, which according to FIG. 1 (as well as FIGS. 4 and 5) is intended for grooving and is of the fundamental embodiment described in Murén et al. U.S. Pat. No. 4,755,085, which is hereby incorporated herein by reference. The cutting insert is clamped by a securing device in the form of a screw 9, which is fed through smooth holes in both the cutting insert and the cassette plate and is screwed firmly into a threaded bore 10 in the mounting surface 2a of the recess 2.

Alternatively the screw 4 can be dispensed with, whereby both the cutting insert 8 and the cassette plate 3 are clamped only with the clamping screw 9. Further, the holder arrangement H need not include the cassette plate 3, whereby the raised portion 24 would instead be formed directly on the mounting surface 2a of the holder body 1.

FIGS. 4 and 5 show the same cutting insert as FIG. 1. From FIG. 4 it is apparent that the cutting insert includes a recess 13 in its under side or bottom surface, which corresponds to the raised plateau surface 7. The depth of the recess 13 can be between 0.8 and 3 mm depending on the size of the insert and the application. The bottom surface 14 of the recess 13 is not intended to abut against said support surface 7; instead a certain gap should exist between those surfaces 7, 14. Further the recess 13 includes three generally upright abutment surfaces 15A, 15B and 15C, which suitably form an angle with the vertical plane of up to 25°, preferably between 3 and 15°. The corresponding generally upright support surfaces 16A, 16B and 16C of the raised portion 24 are angled to the same degree. In order to make it possible to index the cutting insert, the angle between the surfaces 15A–C, or between the surfaces 16A–C, is substantially 60°. By deliberately positioning the hole 24A slightly closer to the side surface 16C than to the other side surfaces 16A, 16B, the screw 9 will force two (15A, 15B) of the cutting insert's three abutment surfaces 15A–C tightly against the support surfaces 16A and 16B, respectively, but a gap will occur between the surface 16C and the corresponding abutment surface 15C on the cutting insert. That is, in addition to a first force F extending perpendicular to a plane of the insert, the screw 9 also generates a second force P (FIG. 8) oriented parallel to the plane of the insert and extending at equal oblique angles (i.e., non-parallel and non-perpendicular) to the support surfaces 16A, 16B as the insert is viewed in a direction perpendicular to the chip surface of the insert (i.e., as viewed in FIG. 8). Hence the screw 9 will force the abutment surfaces 15A, 15B against the respective support surfaces 16A, 16B, while forcing the abutment surface 15C out of contact with the support surface 16C. However, when the insert is subsequently indexed, the abutment surface 15C will abut one of the support surfaces 16A, 16B, and one of the abutment surfaces 15A, 15B will be in spaced facing relationship with the support surface 16C.

This double-sided contact is intended to avoid excessive static definition of position. Consequently, the geometrical figure described by abutment surfaces 15A–C is somewhat larger than the figure described by 16A–C. When two of the abutment surfaces (e.g., 15A and 15B) are brought into abutment with respective support surfaces of the plateau 24 (e.g., 16A and 16B), the gap between the third abutment surface 15C and the corresponding abutment surface 16C is suitably between 0.2 and 2 mm, preferably between 0.2 and 1 mm.

Figure 9:
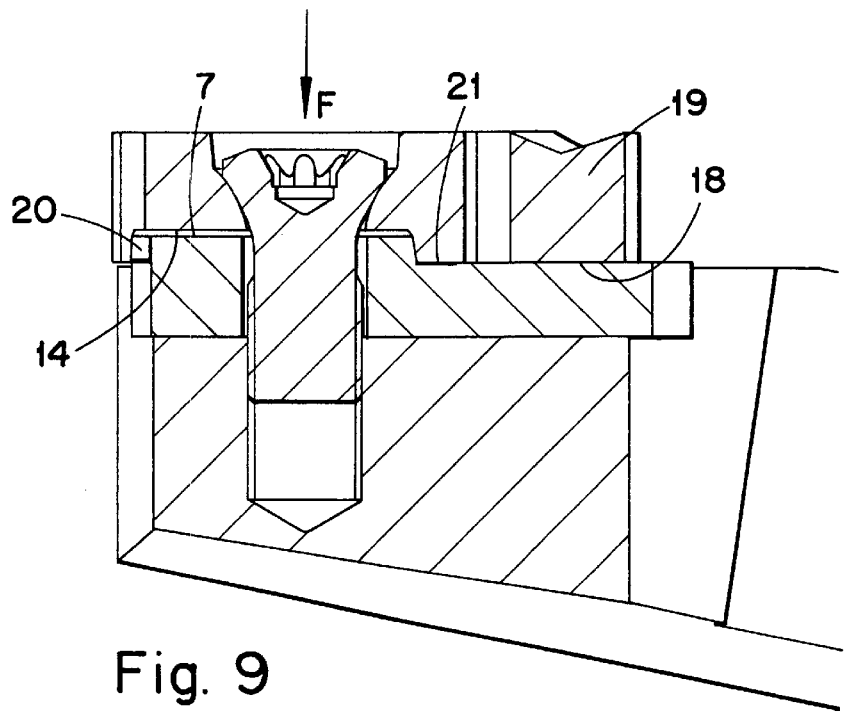
FIG. 9 shows the vertical section IX—IX in FIG. 8.
Figure 8:
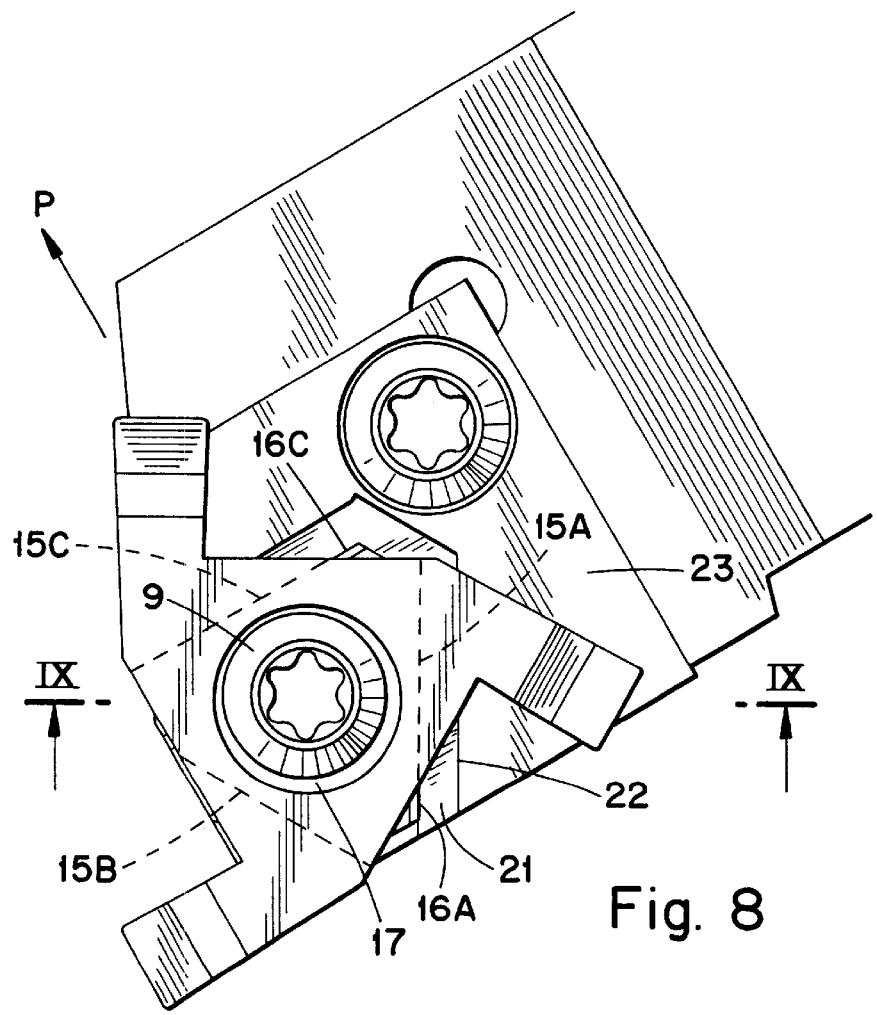
FIG. 8 shows a cutting insert mounted in accordance with the invention, straight from above.

The actual clamping is shown in FIGS. 8 and 9. It can easily understood from the eccentric position of the screw 9 relative to the insert hole 17 that the cutting insert will be pushed in a direction corresponding to the force P. Thereby the abutment surfaces 15A, 15B of the cutting insert abut the support surfaces 16A and 16B, respectively, while the abutment surface 15C disposed face to face with support surface 16C does not abut that surface 16C. As can be seen from the section view in FIG. 9, the undersides 18 of the insert's three insert corners 19 abut the planar upper side 23 of the cassette plate, in order to convey the necessary stability to the cutting insert. Thus, each of the undersides 18 forms a portion of a downwardly facing abutment surface which engages respective portions 23 of the upwardly facing support surface. Owing to the fact that the cutting insert can be displaced until two of its abutment surfaces 15A, 15B lie tight against respective support surfaces 16A, 16B, this does not imply any excessive static definition of position. Further the gap which arises between the plateau surface 7 and the bottom of the recess 14 is shown in FIG. 9, as well as the gap 20 which arises between the non-abutting surfaces 15C and 16C.

In order to avoid a possible fillet, which could occur on the cassette plate in the transition between a support surface 16A, B or C and the upper surface of the cassette plate, a shallow edge recess 21 can be provided along the support surfaces 16A–C. Line 22 indicates the border line of the edge recess against the adjacent upper surface of the cassette plate.

As mentioned above, one of the substantial advantages of the present invention is that inserts of very differing geometrical basic shape can be clamped in the same insert location. Hence the triangular cutting insert according to FIG. 2 and 3 can be clamped firmly in the same cutting insert location which is described in connection with FIG. 1. Thereby also this cutting insert features a recess 13' with a bottom surface 14' and abutment surfaces 15A', 15B' and 15C'. Further the cutting insert includes downwardly facing abutment surfaces 18' arranged for abutment against the upwardly facing support surface 23 of the cassette plate 3.

Figure 6:
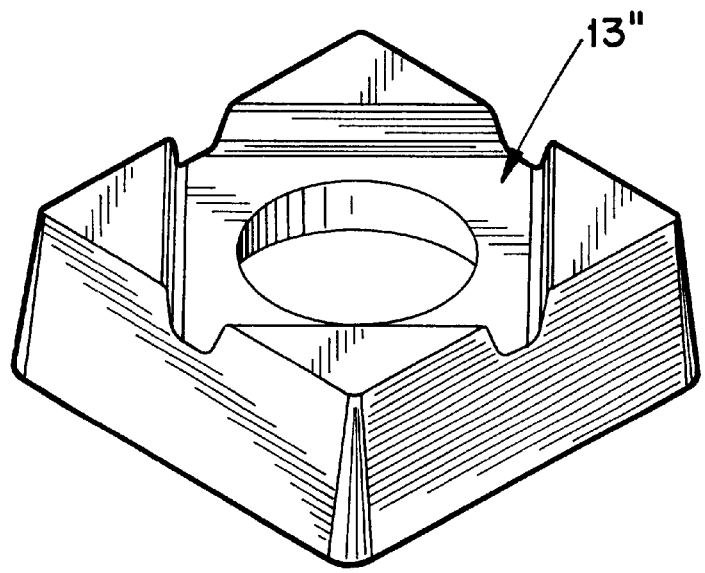
FIG. 6 shows yet another cutting insert according to the invention, obliquely from below.
Figure 7:
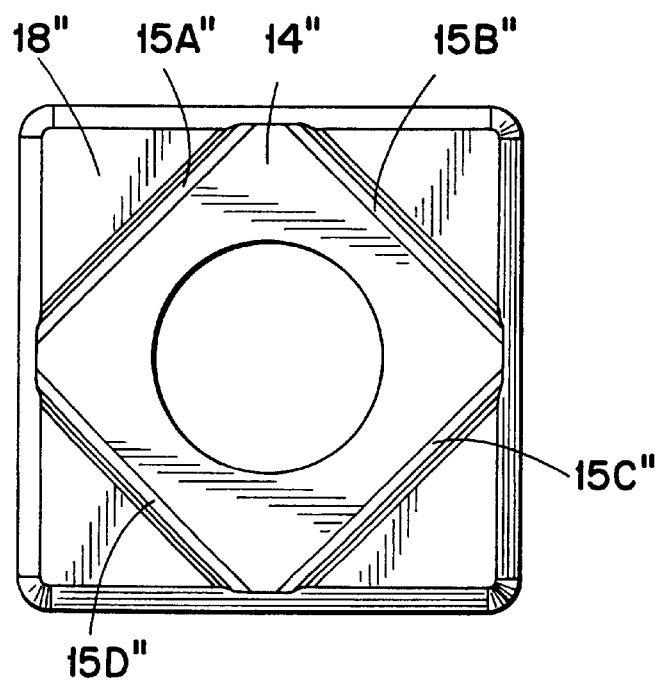
FIG. 7 shows the same cutting insert as in FIG. 6, straight from below.

As shown in FIGS. 6 and 7 a cutting insert in accordance with the invention can also have a square basic form. In this case the lower side of the cutting insert includes a recess 13" with a bottom surface 14" as well as four generally upright abutment surfaces 15A", 15B", 15C" and 15D". Those abutment surfaces form substantially a square with cut-away corners, which are twisted (i.e., angularly offset) in relation to the square of the cutting insert by essentially 45°. When installing the insert, two adjacent abutment surfaces of these four abutment surfaces will abut against two corresponding support surfaces on a raised area 24 of the shim, which is primarily square instead of triangular, but otherwise wholly analogous with the raised area (see 7, 16) shown in FIG. 1. Further in an analogous manner, the square raised areas are somewhat smaller than the square recess 13". The corner portions 18" are arranged to abut against an upper surface of the cassette plate (or in those cases where a cassette plate has been dispensed with, directly onto the corresponding surface in the holder).

Figure 10:
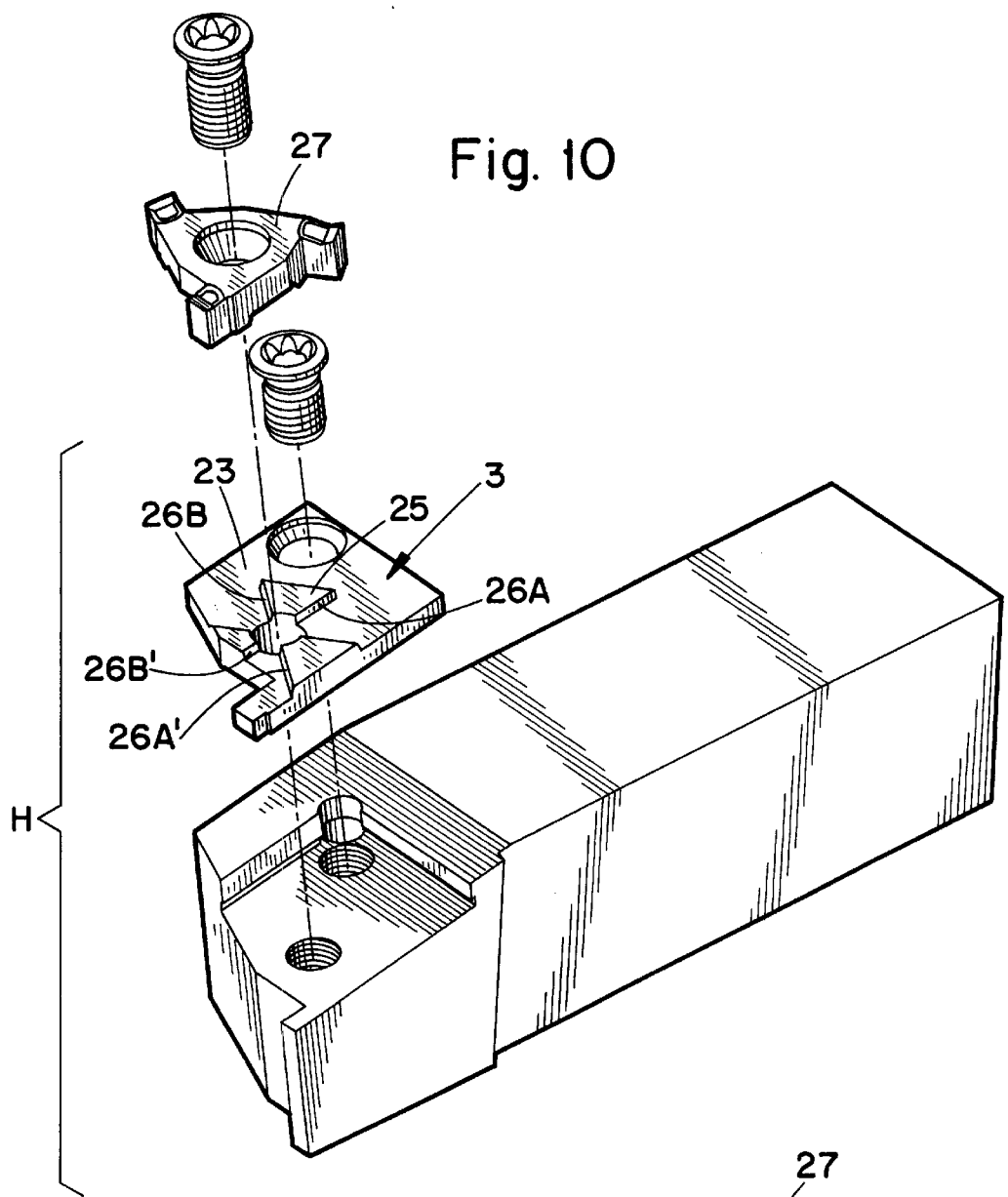
FIG. 10 shows an exploded view of a tool according to another embodiment of the invention, in perspective obliquely from above.
Figure 11:
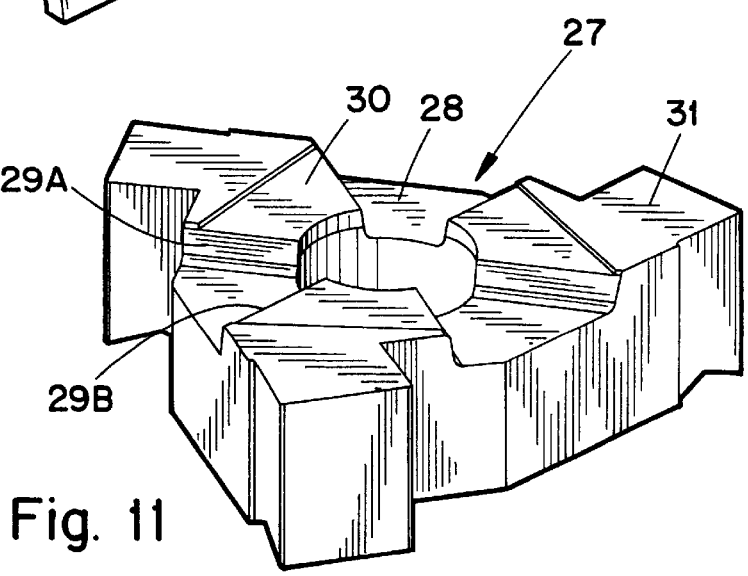
FIG. 11 shows a cutting insert according to the other embodiment of the invention, obliquely from below.

In FIGS. 10 and 11 an exploded view of another embodiment of the invention is shown. According to this embodiment not one, but three, upward projections or raised areas 25 are provided on the shim 3. Similarly to the embodiment described above, the shim 3 could be dispensed with, whereby the three raised areas 25 could be provided directly on the bottom support surface in the recess 2. The raised areas 25 are substantially shaped as sectors and exhibit two side faces or support surfaces 26A and 26B. The lower side of the cutting insert 27 is formed with three downward projections such that they correspond to the raised areas 25. Consequently, the under side of the insert features three recesses 28, each of which is limited on two sides by two generally upright abutment surfaces 29A and 29B. Raised areas 30 are formed between the recesses 28. When installing the cutting insert, however, only a total of two generally upright abutment surfaces of the insert will abut against two support surfaces on the shim. Depending on the relative placement of the raised areas 25, those two active support surfaces can be formed by the two side faces 26A and 26B which are placed furthest away from the operational cutting edges (that is to say, the two which are referred to as 26A and 26B in FIG. 10). Alternatively, the two active support surfaces could be formed by the two side faces 26A' and 26B', which are disposed opposite each other on two adjacent raised areas, preferably nearest the operative cutting edge. Also, raised areas 31 of the under side of the insert located adjacent to respective corners of the cutting insert abut against the upper side 23 of the shim 3.

Figure 12:
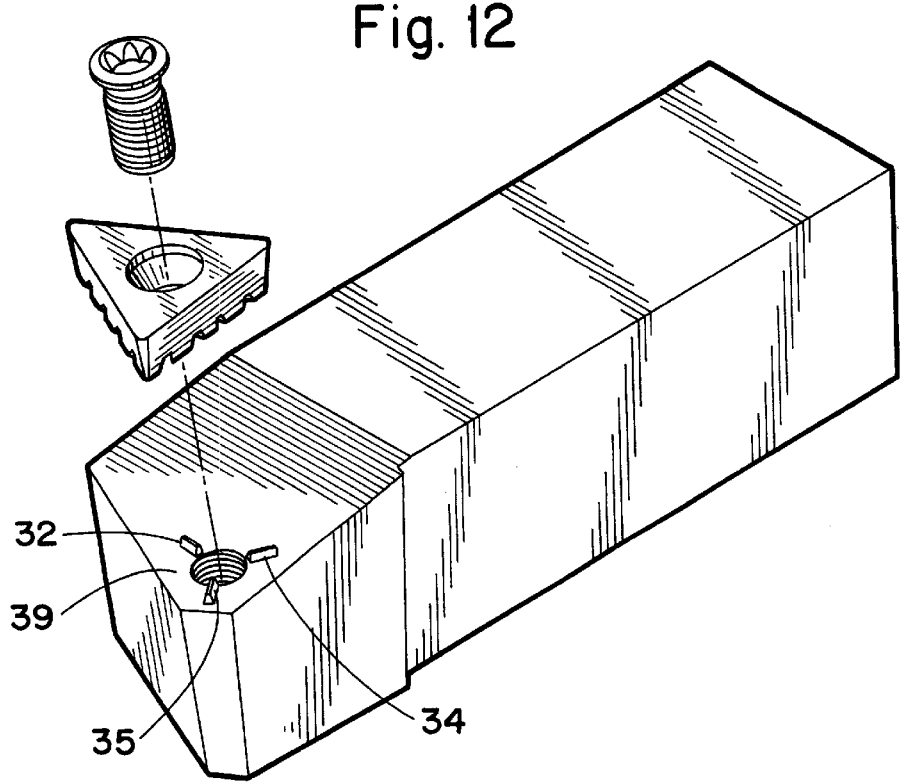
FIG. 12 shows an exploded view of a third embodiment of the invention, in perspective obliquely from above.
Figure 13:
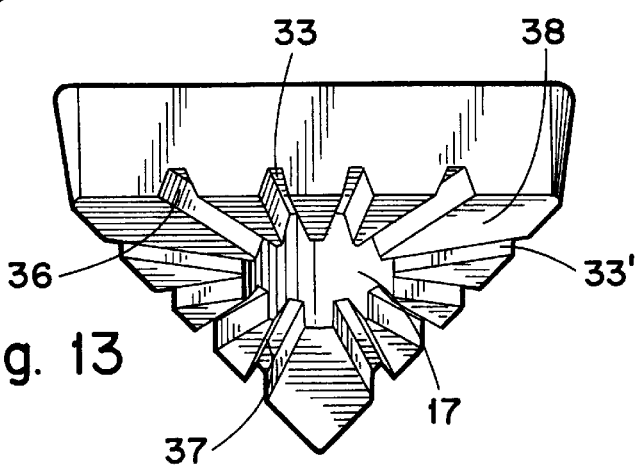
FIG. 13 shows a cutting insert according to the third embodiment of the invention, obliquely from below.
Figure 14:
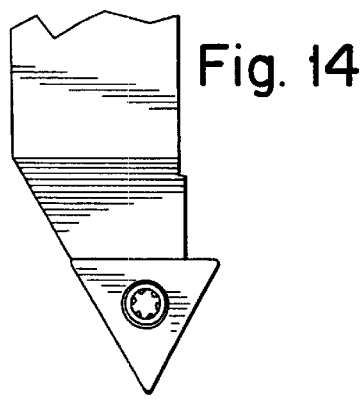
FIGS. 14 and 15 show a cutting insert mounted in a holder according to the embodiment according to FIGS. 12 and 13.
Figure 15:
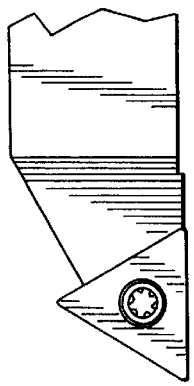

It is not necessary to have large areas with a certain spread between the active support or flank surfaces in the holder or the under side of the cutting insert. Consequently, the active support surfaces could also exist on ridges 32 or grooves 33 as shown in FIGS. 12 and 13. On the holder itself ridges 32 are provided, which suitably are two or three in number. Each ridge has two main side surfaces, which according to FIG. 12 result in altogether six side faces, but only two of these constitute active generally upright abutment support surfaces, namely those with reference indices 34 and 35. These are provided on respective ridges and the angle between them is suitably between 30 and 150°. The remaining four side faces are contact free surfaces. On the under side of the cutting insert altogether twelve grooves 33 are to be found, of which only two come to be in active engagement with the generally upright support surfaces 34, 35. If the angle between the support surfaces 34, 35 is 120° the side faces 36 and 37 in FIG. 13 will for example, abut against them, while groove 33'will surround the remaining third ridge 32 without direct abutment therewith (at least no intentional abutment; this depends on the manufacturing tolerances). Two or three downwardly facing abutment surfaces 38 of the corners abut against the generally upwardly facing support surface 39 of the holder. This happens either through the abutment surfaces of the corner having raised areas in a similar way to the raised areas 31 (see. FIG. 11), or by the said downwardly facing surfaces at the corners sloping somewhat, such that their distance from the upper side is somewhat larger under the corner cutting edge than nearer the center hole 17. Through this variety of grooves on the under side of the cutting insert, the cutting insert can be indexed to a number of positions in relation to the holder and in relation to the workpiece. FIGS. 14 and 15 show consequently two possible positionings of the cutting insert, whereby the cutting insert according to FIG. 15 has been turned by one groove spacing, i.e. 30°, in relation to the installation according to FIG. 14.

Figure 16:
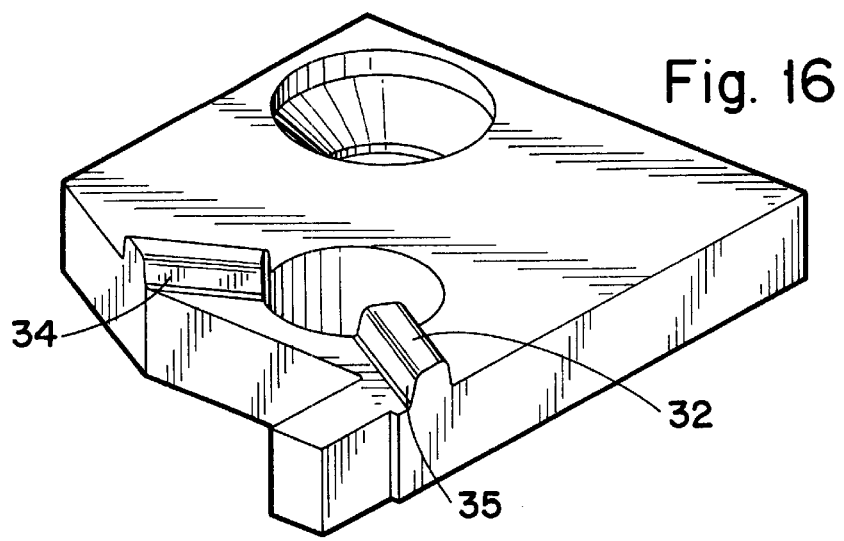
FIG. 16 shows a shim in accordance with the third embodiment, obliquely from above.
Figure 17:
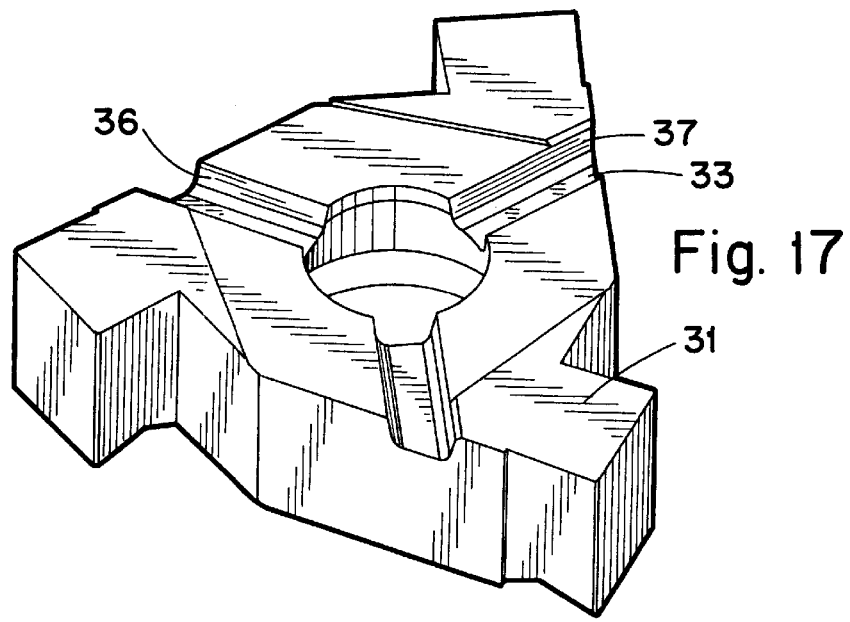
FIG. 17 shows a cutting insert obliquely from below according to the third embodiment.

FIG. 16 shows how a shim can be designed in accordance with the embodiment with ridges and grooves. The shim is formed with two ridges 32, the active support surfaces of which consist of the support surfaces 34 and 35. In accordance with the embodiments described above, abutment between these flank surfaces and corresponding flank surfaces in the grooves (or recess) of the cutting insert is brought-about by a force corresponding to force P of FIG. 8 through the clamping screw. Naturally if it were not for the fact that so many different positions are required, the cutting insert need not have such a large number of grooves as in FIG. 13. The cutting insert according to FIG. 17 is designed with three grooves 33, whereby for example the side faces 36 and 37 abut against the support surfaces 34, 35. The raised under surfaces 31 at the corners abut against the upper side of the shim.

Figure 18:
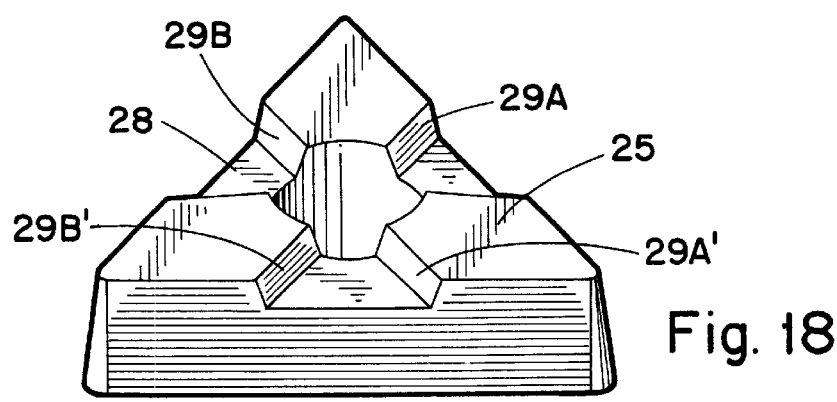
FIG. 18 shows a cutting insert obliquely from below according to an additional embodiment according to the invention.

Finally FIG. 18 shows how a cutting insert with the basic shape of an equilateral triangular can be designed with three recesses 28 in order to be clamped in a holder according to FIG. 10. It either abuts against the two support surfaces 29A, 29B on the same raised area 25 of the shim support surfaces, or the two support surfaces 29A', 29B' abut against the two adjacent raised areas 25. The cutting insert may have minor raised areas on the raised areas 25 (corresponding to 31 in FIG. 11) or the raised areas 25 can be slightly angled, in order to guarantee abutment under at least two corner edges.

In a similar way, the cutting insert can also have for example a rhombic or round basic shape. In these two cases the cutting inserts can suitably also have recesses with a basically square shape, in a corresponding manner to FIGS. 6 and 7.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A tool for metal cutting machining comprising:
a holder including an insert-receiving site for receiving a cutting insert, the site including an upwardly facing bottom support surface and at least two generally upright support surfaces integral with the holder and disposed in non-parallel relationship;
an indexable cutting insert seated on the site and including an upwardly facing chip surface, a downwardly facing abutment surface, and a side surface structure intersecting the chip surface to form therewith a cutting edge structure, the side surface structure defining an outer perimeter of the insert, the generally downwardly facing abutment surface disposed inside of the outer perimeter and abutting the bottom support surface of the site, the insert further including at least three generally upright abutment surfaces disposed inside of the outer perimeter, at least two of the generally upright abutment surfaces being disposed in facing relationship to respective ones of the generally upright support surfaces; and a tightenable insert-securing device arranged for generating a first force oriented in a first direction substantially perpendicular to a plane of the insert and which presses the downwardly facing abutment surface against the upwardly facing support surface, and a second force oriented for pressing at least two, but less than all, of the generally upright abutment surfaces against respective ones of the generally upright support surfaces, the second force extending in a single second direction substantially parallel to the plane of the insert and forming an oblique angle with each of the at least two generally upright abutment surfaces when said insert-securing device is inserted therein and tightened, the oblique angles being visible as the insert is viewed in a direction perpendicular to the chip surface;

the insert, upon loosening of the insert-securing device, being indexable to bring another portion of the cutting edge structure into active cutting position, the generally upright abutment surfaces arranged such that in response to indexing of the cutting insert and a re-tightening of the insert-securing device:

the first and second forces are re-generated in the same first and second directions, respectively;

one of the generally upright abutment surfaces previously disposed out of engagement with a generally upright support surface is moved into abutment with a generally upright support surface by the second force, and a generally upright abutment surface previously in abutment with a generally upright support surface is moved out of abutment with all of the generally upright support surfaces.

2. The tool according to claim 1 wherein the insert-securing device comprises a screw passing through the insert.

3. The tool according to claim 1 wherein the holder includes a plurality of upward projections, each upward projection forming one of the generally upright support surfaces, the insert including a plurality of downward projections each situated between two of the upward projections, each downward projection forming one of the generally upright abutment surfaces.

* * * * *